Figure 1:
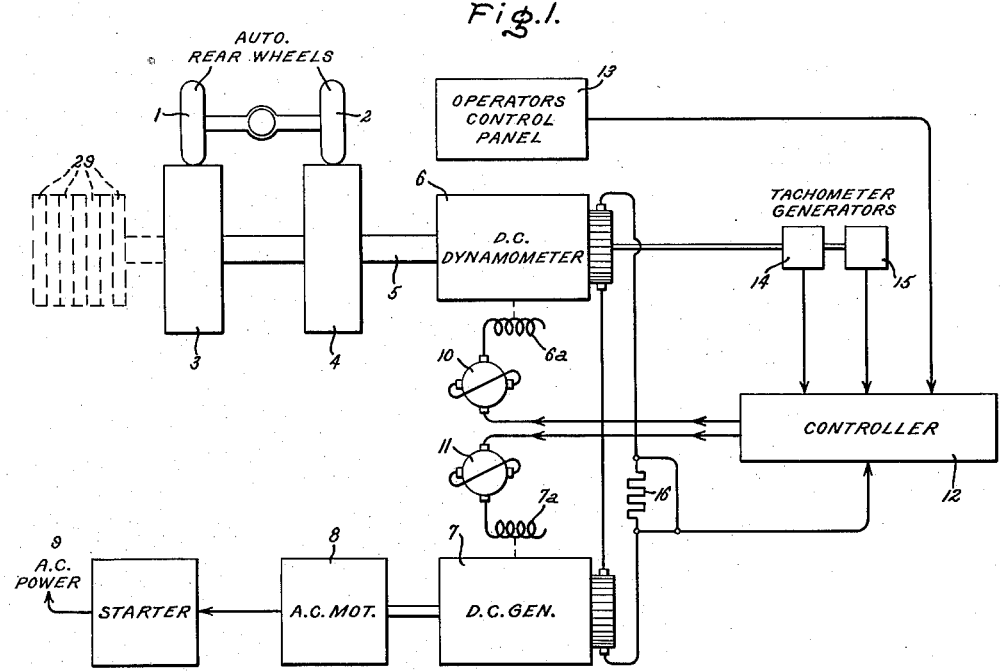

May 2, 1961 H. GIBSON ET AL 2,982,128
DYNAMOMETER CONTROL SYSTEM
Filed Sept. 25, 1957 2 Sheets-Sheet 1

NOTE:
POLARITIES SHOWN FOR
DYNAMOMETER ABSORBING

Inventors:
Hal Gibson,
Russell B. Maddock
by Irving H. Marshman
Their Attorney.

May 2, 1961  H. GIBSON ET AL  2,982,128
DYNAMOMETER CONTROL SYSTEM
Filed Sept. 25, 1957  2 Sheets-Sheet 2
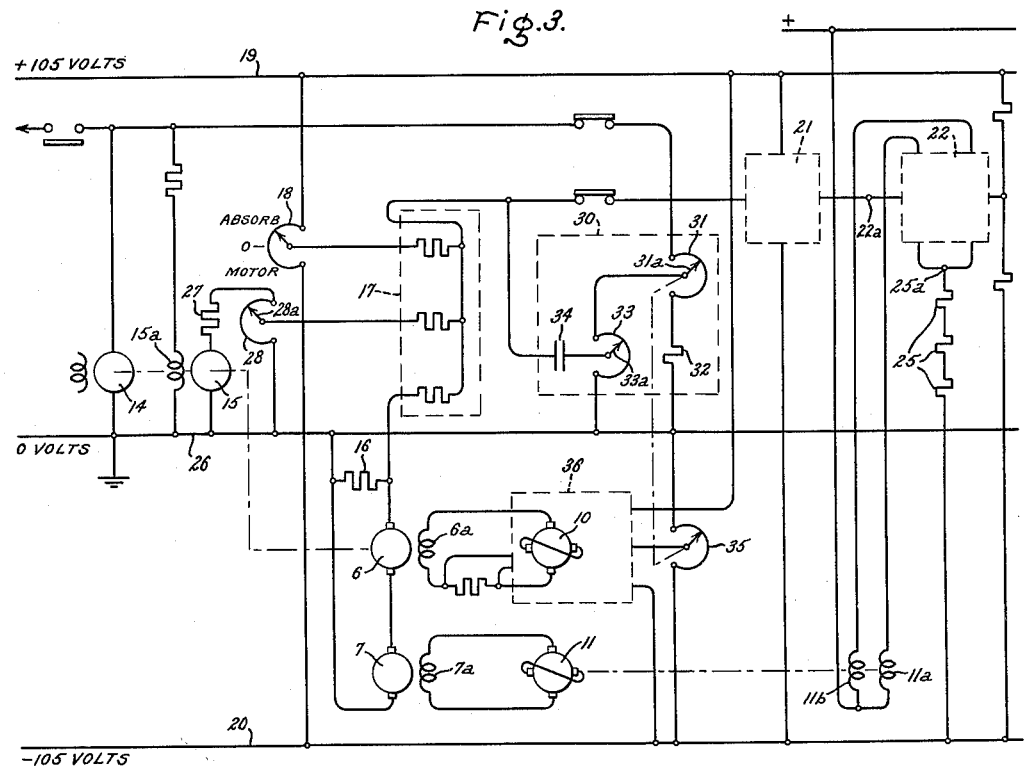
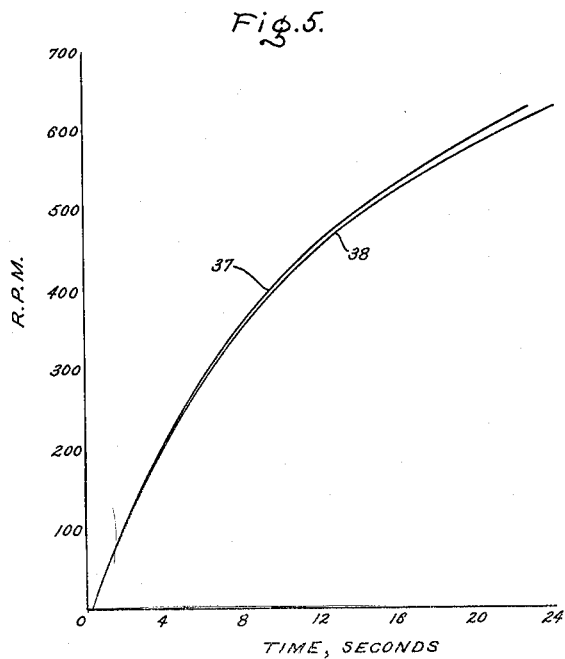
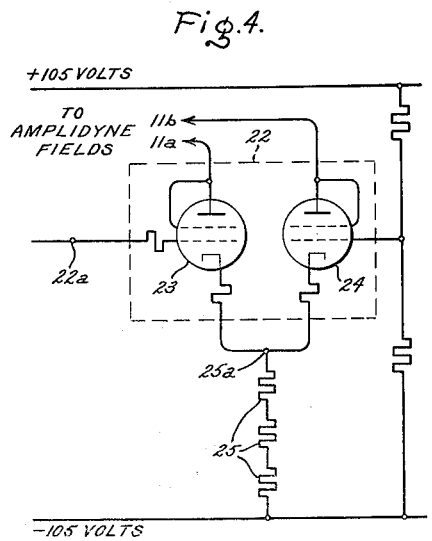
Inventors:
Hal Gibson,
Russell B. Maddock,
by Irving H. Marshman
Their Attorney.

United States Patent Office 2,982,128
Patented May 2, 1961

2,982,128

DYNAMOMETER CONTROL SYSTEM

Hal Gibson, Schenectady, N.Y., and Russell B. Maddock, Roanoke, Va., assignors to General Electric Company, a corporation of New York Filed Sept. 25, 1957, Ser. No. 686,253

2 Claims. (Cl. 73—117)

This invention relates to electrical dynamometers, more particularly to a system for controlling a dynamometer to impose a load having certain characteristics upon a prime mover such as an internal combustion engine, in testing its performance and efficiency, and it has for an object the provision of a simple, reliable, improved and inexpensive control system of this character.

In the automotive industry, electric dynamometers have been used for laboratory simulation of actual road-operating conditions for testing of automotive vehicles and engines. For example, in the automobile industry, dynamometers have been utilized for the simulation of such factors bearing on performance as road load, grade, windage and translational inertia of the vehicle.

Heretofore translational inertia has been represented by a pure mechanical inertia built into the rotating equipment. Generally, an adjustable number of inertia disks or flywheels has been used for obtaining variable mechanical inertias to simulate the effect of the masses of different vehicle bodies and their loads in testing acceleration and deceleration performance of passenger cars, trucks and buses. As many as twenty-four inertia disks having a total weight of ten tons have been used in the testing of a heavy truck chassis. These inertia disks are expensive, require considerable time for changing, occupy valuable installation space and require considerable installation time. Accordingly, a further object of this invention is the provision of a dynamometer control system having means for electrically simulating the effect of translational inertia and thereby eliminating the mechanical inertia disks heretofore used and their attendant disadvantages. A more specific object of the invention is the provision of a dynamometer control system which provides laboratory simulation of translational inertia and which effects substantial savings in valuable floor space, initial cost and the time required to set up for a test.

Another object of the invention is the provision of a dynamometer control system in which simulated translational inertia may be readily changed throughout a wide range of values by means of an easily manipulated electrical control device thereby to eliminate the laborious time-consuming task of setting up and changing massive unwieldy flywheels.

Still another object of the invention is the replacement of bulky expensive flywheels by relatively small, light, compact and inexpensive electrical components such as capacitors and potentiometers.

In carrying the invention into effect in one form thereof, a source of reference voltage is provided which is representative of a desired value of torque to be produced in the driving connections between the dynamometer and a prime mover together with means for producing a signal voltage which is representative of the magnitude of the torque actually existing in the driving connections. An electrical comparison circuit responsive to the difference of these signal voltages varies an electrical operating condition in the dynamometer system in such a sense as to reduce the difference voltage to a minimum and thus to conform the actual torque with the desired preset value. For the electrical simulation of the effect of translational inertia load on the prime mover, means are provided for producing and supplying to the comparison circuit a signal voltage which is representative of the rate of change of speed of the dynamometer thereby to vary the torque reference voltage in accordance with such rate of change of speed.

Figure 2:
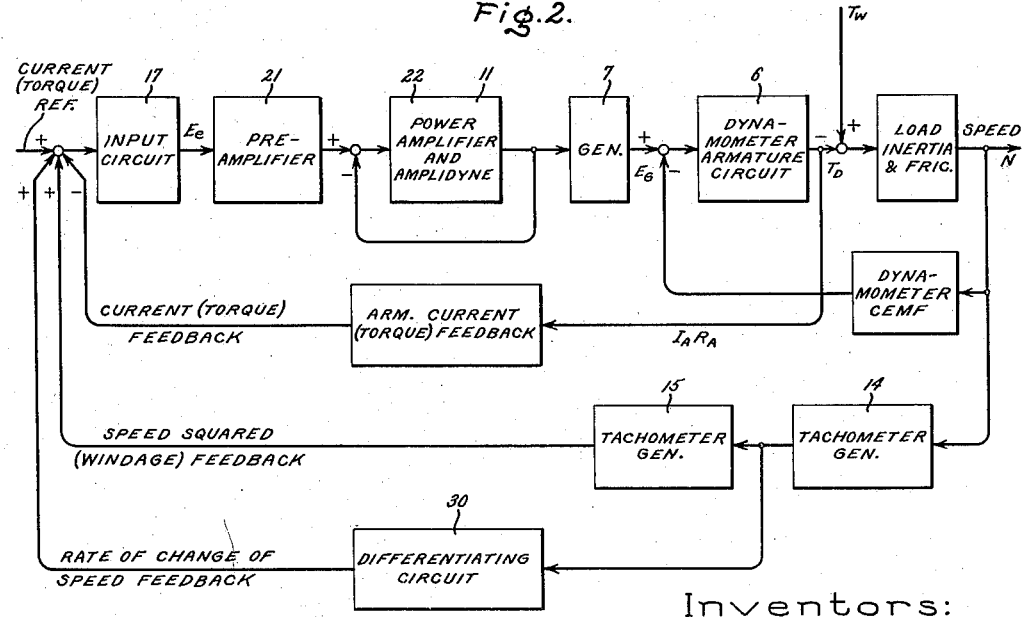

For a better and more complete understanding of the invention, reference should now be had to the following specification and to the accompanying drawings of which Fig. 1 is a simple conventional diagrammatical sketch of mechanical and electrical apparatus employed in a dynamometer test equipment; Fig. 2 is a simple diagrammatical sketch in conventional block diagram form of a dynamometer control system embodying the invention; Fig. 3 is a simple electrical schematic diagram of the dynamometer control system of Fig. 2 including a detailed illustration of the input end of the system; Fig. 4 is an elementary schematic diagram of the power amplifier used in a dynamometer control system to which the invention may be applied; and Fig. 5 is a chart of characteristic curves which facilitate an understanding of the invention.

In illustrating the invention in one form thereof, it is shown as embodied in a control system for chassis dynamometers such as used in the automobile industry for development testing of automobiles and particularly in the imposition on the engine, of the vehicle undergoing test, of loads simulating road load, grade, windage and translational inertia. As shown in Fig. 1, the rear wheels 1 and 2 of the vehicle of which the engine is to be tested, rest upon steel drums 3 and 4 respectively, with the front wheels of the vehicle being securely blocked in place. These steel drums are fixedly mounted upon a shaft 5 for rotation therewith. Conventionally they are approximately four feet in diameter.

Mechanically connected to the shaft 5 for rotation therewith is the rotor member of a dynamometer 6. It may be mounted directly on the shaft 5 or on its own separate drive shaft which is connected to shaft 5 by suitable coupling means. Electrically, the dynamometer is preferably a conventional D.-C. shunt wound machine which may be operated either as a motor or as a generator, depending upon load requirements. Its armature member is connected in a series loop circuit with the armature of a second D.-C. shunt dynamoelectric machine 7, which, also can be operated either as a motor or as a generator. Coupled to the shaft of the machine 7 is a suitable dynamoelectric machine 8 which is illustrated as a conventional squirrel cage type induction motor. It is electrically connected through a motor starter to a source such as represented by the alternating voltage supply conductor 9. The squirrel cage motor may operate as an alternator if torque is supplied to its shaft and excitation current is supplied from the alternating voltage power system. Excitation is supplied to the field winding 6a of the dynamometer and to the field winding 7a of the dynamoelectric machine 7 by separate exciters 10 and 11, respectively, which are controlled by suitable regulating means which are mounted in a controller 12. These exciters 10 and 11 are illustrated as amplidynes. The illustrated combination of machines 6, 7 and 8 is generally known as an adjustable voltage or Ward Leonard system. The controller 12 receives reference voltage input signals from an operator's control panel 13 and feedback speed voltage signals from suitable means which are illustrated as tachometer generators 14 and 15 driven by the dynamometer 6. It also receives an armature current feedback signal voltage from a suitable voltage drop device such as the resistor 16 in the armature circuit of the dynamometer. The dynamometer regulator in the controller 12 is capable of regulating dynamometer speed or armature current as selected by suitable means such as a transfer switch (not shown) on the operator's control panel. In the case of a shunt machine with constant field current excitation, regulation of armature current is closely proportional to regulation of torque. For the purpose of regulating the torque of the dynamometer, a reference voltage is provided with which the armature current signal voltage is compared. This torque reference voltage, which in the block diagram of Fig. 2 is represented by an arrow designated current (torque) reference, is supplied from the operator's control panel 13 to the input circuit 17 of the dynamometer regulator. This input circuit is illustrated as a parallel-type summation or comparison circuit. As shown in Fig. 3 the torque reference voltage is provided by means of a potentiometer 18 which is connected across a regulated direct voltage supply source that is represented by the supply conductors 19 and 20. The voltage of the conductors 19 and 20 with respect to ground have suitable values such as plus 105 volts and minus 105 volts respectively. Also supplied to the comparison circuit 17 is the signal voltage designated $I_aR_a$ in the block diagram which is derived from the armature current by means of the voltage dropping resistor 16 and which is closely proportional to the torque of the dynamometer. The difference of these two voltages, i.e. the error voltage $E_e$ is supplied to a four-stage electronic preamplifier and stability network 21 of which the output is connected to the input of a power amplifier 22. Preferably, this power amplifier is of the buck-boost type, and as illustrated in Fig. 4 comprises a pair of electric valves 23 and 24 connected to operate differentially. Included in series relationship in the anode circuit of valves 23 and 24 respectively are oppositely poled filled windings 11a and 11b of the amplidyne exciter 11. Briefly the operation of this power amplifier is as follows. If the voltage at point 22a should decrease below a predetermined mid-range value, the voltage of the control electrode of valve 23 will be decreased with respect to the voltage of the cathode and less current will flow in the anode-cathode circuit, amplidyne field 11a and cathode resistor 25. Less current flowing in the cathode resistor will cause the voltage at the point 25a to decrease, i.e. become less positive which, in turn, will cause the control electrode to cathode voltage of valve 24 to change in the positive direction. Current in the anode-cathode circuit of valve 24 and amplidyne field winding 11b will increase until an equilibrium condition is established. The net result is that current in the boost field 11a is decreased and current in the buck field 11b is increased. This in turn causes a decrease in the output voltage of amplidyne 11 which effects a corresponding reduction in field current and voltage of the generator 7. An increase in the voltage at point 22a has the opposite effect.

Any difference between the generator voltage and the dynamometer voltage causes current to circulate in the armature circuit and this current in turn produces torque at the dynamometer shaft which is closely proportional to the current. Owing to the feedback to the input circuit of the signal voltage proportional to armature current, this torque is regulated substantially constant at a value related to the magnitude of the torque reference voltage which is determined by the adjustment of the potentiometer 18. This torque control potentiometer may be adjusted to either side of its central zero position to supply either positive or negative reference voltage thereby to control the dynamometer to exert constant absorption or motoring torque respectively. This dynamometer torque is added algebraically to the torque $T_w$ from the automobile wheels and the net shaft torque accelerates or decelerates the inherent inertia of the system.

In order to control the dynamometer to simulate the effect on the automobile engine of the windage load on the automobile, a control voltage representative of the windage load is supplied to the input circuit 17. This is accomplished by supplying to the field winding of the tachometer generator 15 a voltage derived from the output voltage of the tachometer generator 14 and supplying to the input circuit 17 a voltage derived from the output voltage of tachometer generator 15. For deriving the voltage supplied to the comparison circuit, suitable means are provided which are illustrated as a gain adjusting circuit which comprises a resistor 27 and a gain-adjusting potentiometer 28 connected across the output terminals of tachometer generator 15. The slider 28a of the potentiometer is connected to the comparison circuit. Since both tachometer generators are driven from the dynamometer shaft, the output voltage of tachometer generator 15 and the voltage which is derived therefrom and supplied to the comparison circuit are proportional to the square of the speed and thus proportional to the windage load on the vehicle if actually moving at a corresponding speed.

Heretofore, the effect of the translational inertia of the vehicle itself on the performance of the engine has been simulated by mechanical inertia devices such for example as the inertia disks 29 illustrated in dotted lines in Fig. 1 mounted on the shaft 5 for rotation therewith. In order to eliminate these massive expensive devices and their numerous disadvantages, means employing only relatively small, light, compact and inexpensive electrical devices are provided for electrically simulating the vehicle's translational inertia. This means is illustrated as a rate of change or differentiating network 30 which comprises a tapered potentiometer 31, a fixed resistor 32, a potentiometer 33 and a capacitor 34. The tapered potentiometer and the fixed resistor are connected in series relationship across the output terminals of the tachometer generator 14, and constitute a voltage divider to which the output voltage of the tachometer generator is supplied. The potentiometer 33 is connected from the slider 31a of the tapered potentiometer to the zero voltage or ground voltage conductor 26. Between the slider 33a of the potentiometer 33 and the comparison circuit 17 is connected a capacitor 34. Since the voltage supplied to the potentiometer 33 is obtained from the tachometer generator 14 it is therefore proportional to the speed of the dynamometer shaft 5. Consequently, the voltage supplied through the capacitor 34 to the comparison circuit 17 is proportional to the rate of change of speed or acceleration and thus is proportional to the translational inertia of the vehicle. By adjusting the potentiometer 33 to vary the gain of the rate-of-change circuit, the amount of rate-of-change signal voltage can be varied. Thus the effect of this circuit in simulating translational inertia is readily adjustable, and the potentiometer 33 is consequently known as the inertia-adjust potentiometer.

A tapered potentiometer 35 provides a dynamometer field current reference voltage with which is compared a signal voltage which is derived from and is proportional to the dynamometer field current. The difference of these two voltages or the error voltage is supplied to a dynamometer field current regulator 36. This regulator 36 comprises a preamplifier, a power amplifier and the amplidyne 10 which components are substantially identical respectively with the preamplifier 21, the power amplifier 22 and the amplidyne 11 which constitute the torque regulator. The regulator 36 maintains the dynamometer field current approximately constant at a value related to the magnitude of the reference voltage. The electrically simulated inertia signal furnished by the rate-of-change circuit to the comparison circuit 17 must be proportional to the torque constant of the dynamometer which is a function of dynamometer field current. Consequently, the potentiometer 31 which supplies voltage to the inertia adjust potentiometer is mechanically coupled to the dynamometer field reference voltage potentiometer 35. Since the potentiometer 35 is tapered, the potentiometer 31 is tapered identically in order to compensate for the nonlinearity of the operation in the field-weakening range of the dynamometer so that for a given setting of the inertia-adjust potentiometer, the amount of electrically simulated inertia remains constant, irrespective of the value of the dynamometer field current.

With the foregoing understanding of the elements and their organization, the operation will readily be understood from the following description. The current or torque reference voltage which is representative of the road and grade load to be simulated is set by adjusting the potentiometer 18 and is supplied to the comparison circuit 17. Assuming that absorption operation of the dynamometer is desired, the slider 18a of the potentiometer is moved in a clockwise direction from its zero position so that the polarity of the reference voltage with respect to ground will be positive. The voltage drop across series resistor 16 in the armature circuit supplies to the comparison circuit a signal voltage of which the magnitude is closely proportional to the actual torque in the dynamometer shaft and of opposite polarity with respect to the reference voltage. The voltage which is derived from the tachometer generator 15 and is proportional to the square of the speed and which is of the same polarity as the reference voltage is supplied from the windage potentiometer to the comparison circuit. The windage potentiometer is adjusted to supply the amount of this signal voltage which is to be used in the test. Similarly, the inertia-adjust potentiometer 33 is adjusted to provide the desired amount of rate of change signal voltage for the specific amount of inertia which is to be simulated in the test. This simulated inertia signal voltage is also supplied to the comparison circuit in the same polarity as the torque reference voltage.

In response to the error voltage, i.e. the difference between the reference voltage and armature current feedback voltage, the torque regulator, i.e. the amplifiers 21, 22 and the amplidyne 11 control the field of the generator 7 so that the dynamometer armature current and torque are maintained close to the value represented by the magnitude of the reference voltage set upon the potentiometer 18 if the windage potentiometer 28 and inertia-adjust potentiometer are set at zero.

Since the signal voltage from the windage potentiometer 28 is proportional to the square of the speed and is of the same polarity as the reference voltage, it has the effect of increasing the reference by an amount proportional to the square of the speed. This causes the armature current and the dynamometer torque to increase correspondingly. Similarly, since the rate of change of speed-signal voltage is of the same polarity as the torque reference voltage, it has the effect of increasing the latter an amount proportional to the rate of change of speed, and this likewise causes the armature current to increase proportionally.

A comparison of the operation of a dynamometer control system embodying the invention with the same system utilizing mechanical inertia disks mounted on the dynamometer shaft for mechanical simulation of the translational inertia of the vehicle is illustrated by means of curves in Fig. 5 in which ordinates represent speed, and abscissae represent time in seconds. For an actual test run with four inertia disks mounted on the dynamometer shaft, the current (torque) reference potentiometer set for a normal average value of road load and zero percent grade, a dynamometer field current of 4.5 amperes and the inertia-adjust potentiometer set at zero percent, a plot of the readings of speed versus time is represented by the curve 37. For a test run with zero inertia disks on the dynamometer shaft, the inertia adjust potentiometer set at 40% and all other settings and conditions the same, a plot of the relationship of speed versus time is represented by the curve 38. Both test runs were made at wide open throttle, i.e. the engine throttle "floored" as rapidly as possible at zero time.

By reversing the sense of the rate of change of speed signal voltage, the condition of "negative" translational inertia can be simulated. This has the effect of counteracting or reducing the system inertia and thus makes it possible to determine engine performance under relatively low system inertia load. The dynamometer system will be stable as long as the simulated "negative" inertia does not exceed, under any conditions, the system mechanical inertia or, in other words, as long as there is actually an appreciable mechanical inertia available in the system.

The invention is not limited to a system in which the dynamometer is a D.-C. generator. It may also be used in applications involving the same principle of control but using an eddy current dynamometer of the cradled or torquemeter type. In such applications the rate of change feedback signal voltage is utilized and compared directly with a signal voltage derived from the weighing system of the torquemeter.

Although in accordance with the provisions of the patent statutes, this invention is described as embodied in concrete form and the principle thereof has been explained together with the best mode in which it is now contemplated applying that principle, it will be understood that the invention is not limited to the apparatus shown and described since alterations and modifications will readily suggest themselves to persons skilled in the art without departing from the true spirit of this invention or from the scope of the annexed claims.

What we claim as new and desire to secure by Letters Patent of the United States is:

1. In a device for testing automotive vehicle prime movers, an adjustable voltage generator having an armature and a field winding, a dynamometer comprising a dynamoelectric machine adapted to be mechanically coupled to the driven wheels of the vehicle and having an armature connected in circuit with the armature of said generator and provided with a field circuit, a first potentiometer for varying the excitation current in said field circuit, a source of reference voltage representative of a predetermined value of current in the armature circuit of said dynamoelectric machine, means for deriving from said armature current a signal voltage representative of the magnitude of said current comprising a voltage drop device connected in said armature circuit, means for relating the magnitude of said armature current to said reference voltage comprising a parallel summation type comparison network responsive to the difference of said reference and signal voltages for varying the excitation of said generator to vary its armature voltage to reduce said difference voltage to a minimum, and means for simulating the effect of the inertia load of the vehicle on the prime mover during a change in its speed comprising a tachometer generator mechanically connected to said dynamoelectric machine for producing a second signal voltage representative of the speed of the prime mover, a second potentiometer supplied from said tachometer generator and having its movable contact ganged with the movable contact of said first potentiometer to compensate for changes in the torque constant of said dynamometer resulting from adjustment of said first potentiometer and an electrical differentiating circuit comprising a capacitor included in the connections between the slider of said second potentiometer and said comparison network for modifying the effect of said reference voltage in accordance with the rate of change of speed of said dynamoelectric machine.

2. In a dynamometer system including an electrical generator connected to a prime mover, a potentiometer for controlling said generator field, a source of reference voltage corresponding to a predetermined armature current of said generator, means for deriving a first potential representative of said armature current, means for maintaining said current constant at the predetermined value comprising a comparison circuit responsive to the difference of said reference voltage and said potential to reduce said voltage difference, means for simulating the effect of an inertia load on said prime mover including a tachometer generator for obtaining a potential representative of the prime mover speed, a potentiometer supplied from said tachometer generator, the movable contacts of both potentiometers being mutually coupled for operation, and a differentiating circuit between the latter mentioned potentiometer and the said comparison circuit for modifying said reference voltage according to the acceleration or deceleration of the first said generator.

References Cited in the file of this patent

UNITED STATES PATENTS

| | | |
|---|---|---|
| 2,685,199 | Wilson et al. | Aug. 3, 1954 |
| 2,785,367 | Roman et al. | Mar. 12, 1957 |